UNITED STATES PATENT OFFICE.

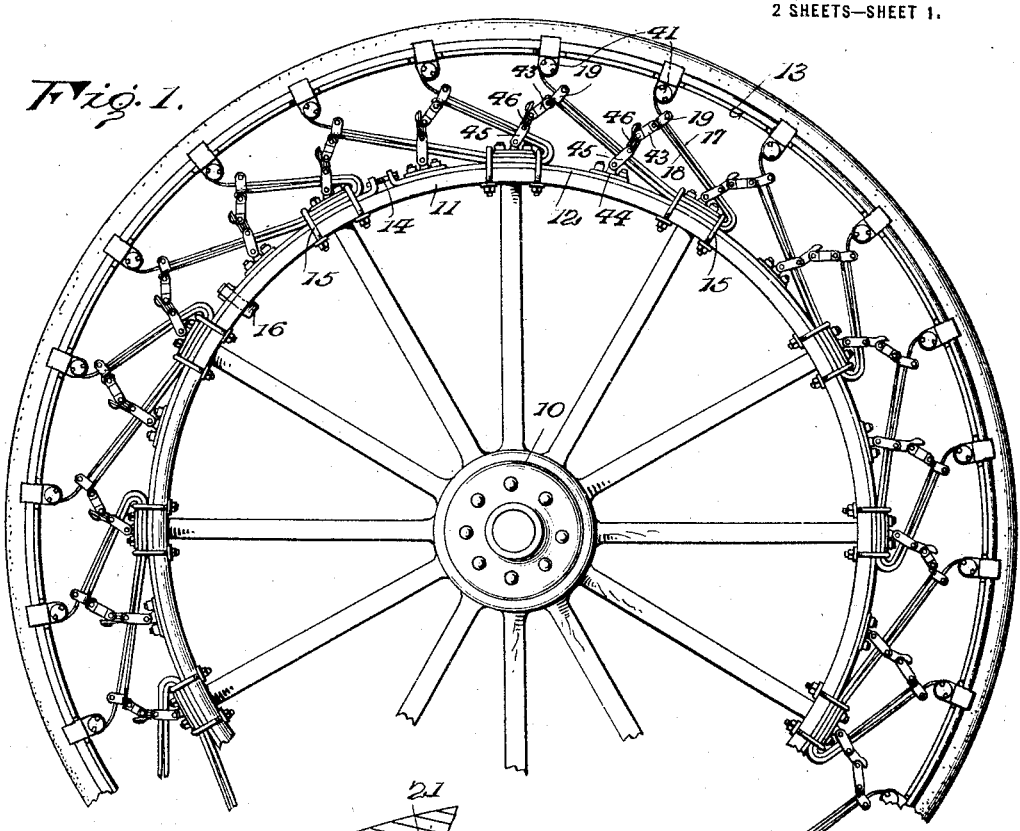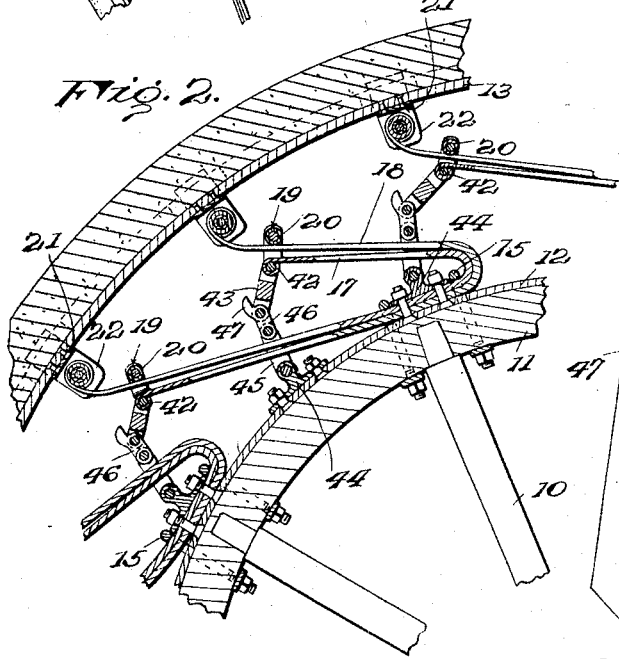

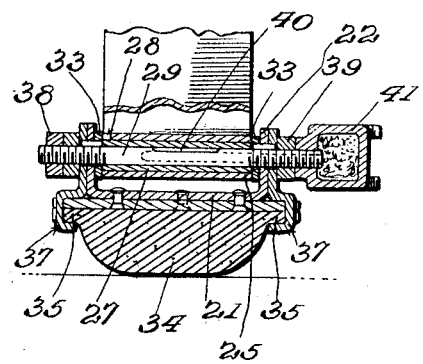
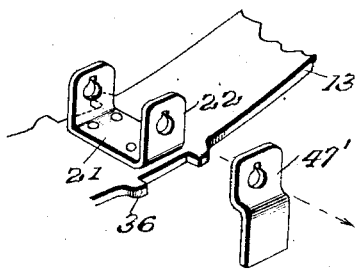
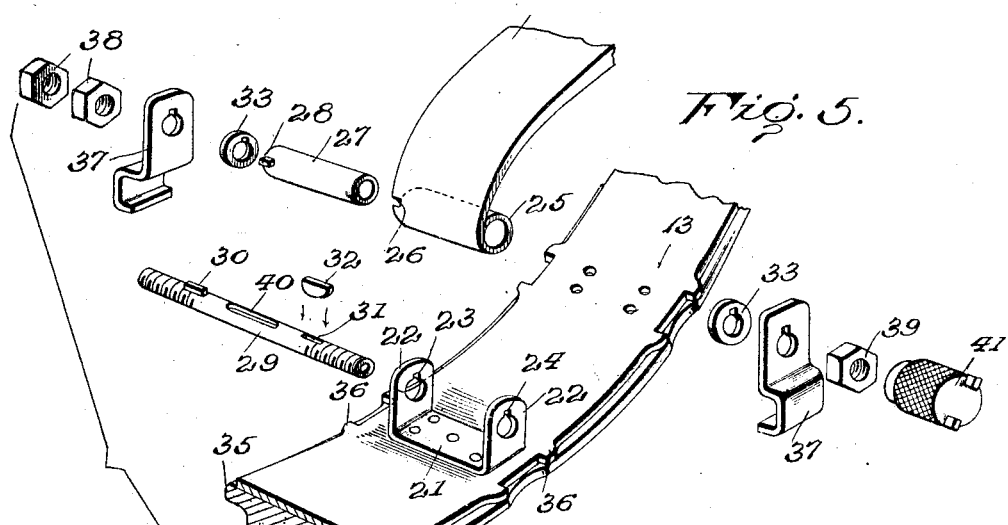
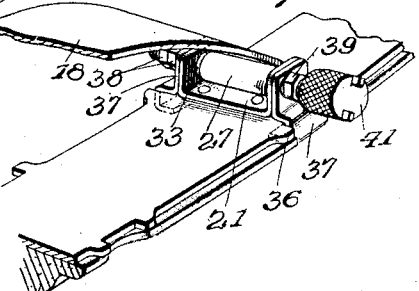
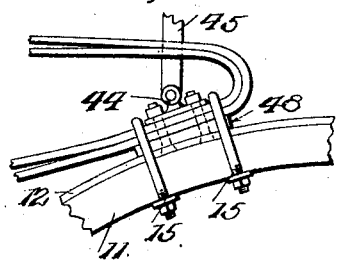

WILLIAM W. ALLEN, OF STREATOR, ILLINOIS.

SPRING-TIRE.

1,365,016.  Specification of Letters Patent.  Patented Jan. 11, 1921.

Application filed August 6, 1919. Serial No. 315,707.

*To all whom it may concern:*

Be it known that I, WILLIAM W. ALLEN, a citizen of the United States, residing at Streator, in the county of La Salle and State of Illinois, have invented certain new and useful Improvements in Spring-Tires, of which the following is a specification.

This invention relates to an improved resilient vehicle wheel tire and has as its primary object to provide a device of this character which may be attached to the wheels of motor vehicles to supplant the usual pneumatic tire while, at the same time, the vehicle wheel will be effectively cushioned by the tire.

The invention has as a further object to provide a tire which may be easily and firmly connected to substantially any conventional type of motor vehicle wheel without the necessity for structural change therein.

And the invention has as a still further object to provide a tire which will be characterized by simplicity of construction and which will also prove thoroughly effective in practical use.

Other and incidental objects will appear hereinafter. In the drawings:

Figure 1 is a fragmentary elevation showing my improved tire applied to a conventional type of motor vehicle wheel.

Fig. 2 is a fragmentary sectional view more particularly illustrating the mounting of the cushioning springs of the tire.

Fig. 3 is a detail perspective view showing the type of stay employed between the free end portions of the cushioning springs and the felly band of the tire, the parts being disassembled, Fig. 4 is a transverse sectional view showing the connection between the free ends of the cushioning springs and the outer tire band employed, Fig. 5 is a detail perspective view showing one of the tire band brackets and associated parts disassembled.

Fig. 6 is a detail perspective view showing one of the brackets and associated parts assembled, Fig. 7 is a fragmentary perspective view showing a slight modification, and Fig. 8 is a fragmentary side elevation showing a still further slight modification.

In order that the construction, mounting and operation of my improved resilient tire may be accurately understood I have, in the drawings, shown the tire in connection with a conventional type of motor vehicle wheel 10. This wheel is provided with the usual felly 11, through which is formed the ordinary opening for receiving the casing of a tire valve. In carrying the invention into effect, I employ concentric inner and outer resilient bands 12 and 13 respectively. These bands are formed of suitable resilient material and the inner band provides an attaching band for the tire while the outer band provides a tread receiving band. The inner band is split and is contracted tightly around the felly by a suitable clamping bolt 14. Holding this band against transverse displacement from the felly is a plurality of clips 15 and securing said band against creeping is a bolt or other suitable fastening device 16 engaging through the tire valve casing opening in the felly and through said band. In any instance where a wheel is equipped with a dished felly band, a packing may be employed beneath the band 12 to provide a flat bearing face for said band. Supporting the outer band 13 with respect to the inner band 12 is a plurality of cushioning springs. Each of these springs is formed of mating substantially U-shaped leaves 17 and 18 respectively, the leaf 17 fitting within the leaf 18 and both of the leaves being secured by spaced bolts or other suitable fastening devices engaged therethrough and through the band 12. The inner end portion of the leaf 17 is free and extends beneath the outer end portion of the leaf 18 to diverge therefrom. Similarly, the inner end portion of the leaf 18 is free and extends beneath the outer end portion of the leaf 17 to diverge therefrom. Formed or otherwise mounted upon the inner terminals of the leaves 17 and 18 are shackles 19 engaging over the outer end portions of said leaves and equipped with rollers 20 bearing thereover. As will be clear, these shackles will connect the inner and outer end portions of the leaves and will brace the outer end portions of the leaves against displacement relative to the inner end portions thereof. The leaves gradually taper in width and thickness from the middle portions thereof toward opposite ends. Consequently, the end portions of the leaves will readily respond to stress thereon. However, it should be observed that the outer end portions of the leaves are designed to normally support the load but when these end portions of the leaves are flexed inwardly they will then gradually move into contact with the inner end portions of the leaves throughout their length when the inner end portions will act to reinforce and yieldably sustain the outer end portions of the leaves. Furthermore, it is to be noted that the inner end portions of the leaves will resist outward flexing movement of the outer end portions of said leaves. Consequently, these springs will effectually sustain and cushion the outer band both when the wheel is turning forwardly and when the wheel is turning rearwardly.

Mounted upon the outer band 13 at its inner side is a plurality of substantially U-shaped brackets 21 each having spaced inwardly directed lugs 22. One of these brackets is shown in detail in Fig. 5. The lugs are provided with alined openings from which extend key slots indicated for convenience at 23 and 24 respectively. The outer ends of the leaves 17 and 18 of the cushioning springs are formed with loops 25 and these loops are each provided at the inner side of the tire with a key slot 26. Removably fitted through the loops are bushings 27 provided at their inner ends with keys 28 engaging within the slots 26. The bushings will thus be held against rotation within the loops. The loops are received between the lugs 22 of the brackets 21 and extending through the alined openings of said lugs and through the bushings 27 are pivot pins 29 pivotally connecting the cushioning springs with the outer band. The pivot pins 29, adjacent their inner ends, are formed with keys 30 and adjacent their outer ends, are formed with slots 31 adapted to receive keys 32. The keys 30 engage within the slots 23 and, after the pivot pins have been fitted through the bushings 27, the keys 32 are fitted within the slots 31 to engage within the slots 24. The keys 30 and 32 will thus lock the pivot pins against rotation. Surrounding the pivot pins and bearing between the ends of the loops 25 and the lugs 22 of the brackets are washers 33. The innermost of these washers are engaged with the keys 30 while the outermost of the washers are engaged with the keys 32 so that the washers are also locked against rotation upon the pivot pins. As will be seen, I thus provide a very efficient type of connection between the outer ends of the loops of the cushioning springs and the outer band of the rim, and a construction tending to eliminate undue wear.

Tightly fitting around the outer band 13 is a tread 34 which is preferably constructed of rubber. This tread is provided with reduced marginal flanges 35 projecting slightly beyond the side edges of the band. Formed on the edges of the band at opposite ends of the brackets 21 are oppositely disposed pairs of lugs 36, and fitting between these pairs of lugs are clips 37 engaging over the flanges 35 of the tread. The clips at the inner side of the tire are fitted upon the inner ends of the pins 29 and are held by superposed nuts 38. These clips are provided with key slots receiving the keys 30 so that the clips are thus locked upon the pins. The clips at the outer side of the tire are fitted upon the outer ends of said pins and are held by nuts 39. These latter clips are also provided with key slots receiving the keys 32 and are thus locked upon the pins. As will be clear, the nuts 38 and 39 may be adjusted for clamping the clips over the marginal flanges 35 of the tread and tightly binding the tread upon the outer rim band. Formed in the pins 29 are lubricant channels 40 entering through the outer ends of the pins and emerging medially thereof. Communicating with these channels are grease cups 41 threaded upon the outer ends of said pins. Consequently, the bearing surfaces of the pins and bushings 27 may be lubricated by simply adjusting the cups inwardly upon the outer ends of the pins, it being understood, of course, that the grease cups are filled with a suitable hard grease. Wear between the pins and the bushings may thus always be maintained at a minimum.

In connection with the cushioning springs I employ stays for bracing the free end portions of the springs against lateral strain as well as limiting such portions of the springs in their outward flexing movement. At their inner ends the spring leaves 17 and 18 are formed with loops 42 and pivotally connected to these loops are links 43. Secured to the inner band 12 between the cushioning springs and also secured within the bight of each of said springs is a plurality of brackets 44 to which are pivotally connected at their inner ends shackle plates 45 lying at opposite edges of the spring leaves. Pivotally mounted between these plates at their outer ends are links 46 which, in turn, are pivotally secured to the links 43 and are provided with stop lugs 47 to coact therewith. As will be observed, the links 43 and 46 of the stays will normally stand in angular relation to each other and will readily swing to permit inward flexing movement of the cushioning springs so that these springs may properly cushion the outer band. However, it will be noted that when the cushioning springs are flexed outwardly, the stays will limit the free end portions of the springs in their outward flexing movement for resisting undue stress upon the springs, the stop lugs 47 being adapted to engage the links 43 to prevent these links from swinging beyond the pivotal center of the connection between the links. Thus, the stays will act to materially strengthen the tire in that they will prevent undue movement of the outer tire band relative to the inner band thereof and will also prevent undue flexing of the cushioning springs. Furthermore, it will be seen that the stays will serve to also brace the cushioning springs against side thrust as well as such thrust as will be brought to bear upon the springs should the turning movement of the wheel be suddenly stopped or reversed.

In Fig. 7 of the drawings, I have illustrated a slight modification of the invention whereby the tire is adapted to travel upon a railway rail. In this modification the tread 34 of the preferred construction is eliminated as are also the clips 37, clips 47' being employed upon the inner ends of the pivot pins connecting the cushioning springs with the outer tire band. The clips 47' will thus project radially beyond the inner edge of the outer tire band to coact with the inner edge of a rail tread. Consequently, a vehicle having its wheels equipped with this modified construction of rim may readily travel upon a railway track. Except as noted, the construction of the modification, as shown in Fig. 7, is identical with the preferred construction.

In Fig. 8 I have illustrated a further slight modification wherein saddle plates 48 are provided for the main cushioning springs. These saddle plates may, as will be clear, be employed either in connection with the preferred form of the invention or in connection with the modified structure shown in Fig. 7.

Having thus described the invention, what is claimed as new is:

1. A resilient tire including inner and outer bands, a plurality of cushioning springs supporting the outer band with respect to the inner band, each of said springs comprising mating leaves fixed to the inner band, the outer ends of the leaves being connected with the outer band and the inner end of each leaf projecting beneath and being connected with the outer end portion of the other leaf, and means for connecting the inner band with a wheel felly.

2. A resilient tire including inner and outer bands, a plurality of cushioning springs supporting the outer band with respect to the inner band, each of said springs including mating substantially U-shaped leaves fitting one within the other and fixed to the inner band, the outer ends of the leaves being pivotally connected with the outer band and the inner end of each leaf projecting beneath the outer end portion of the other leaf and being freely connected therewith, and means for connecting the inner band with a wheel felly.

3. A resilient tire including inner and outer bands, a plurality of cushioning springs supporting the outer band with respect to the inner band, brackets carried by the outer band and provided with spaced lugs, loops formed on the outer ends of said springs, bushings fitted in said loops, pivot pins extending through the lugs of said brackets and the bushings for pivotally connecting the springs with the outer band, a tread surrounding the outer band, means carried by said pivot pins for connecting the tread with the outer band, and means for connecting the inner band with a wheel felly.

4. A resilient tire including inner and outer bands, a plurality of cushioning springs supporting the outer band with respect to the inner band, brackets carried by the outer band and each having spaced lugs, loops formed on the outer ends of said springs, bushings fitted in the loops, means locking the bushings against rotation within the loops, pivot pins fitting through said lugs and through the bushings and pivotally connecting the springs with the outer band, means locking the pins against rotation upon the lugs, and means for connecting the inner band with a wheel felly.

5. A resilient tire including inner and outer bands, a plurality of cushioning springs supporting the outer band with respect to the inner band, brackets carried by the outer band and each provided with spaced lugs, loops formed on the outer ends of said springs and fitting between the lugs of the brackets, pivot pins extending through the lugs and said loops and pivotally connecting the springs with the outer band, a tread surrounding the outer band, clips carried by said pins and engaging the tread, means adjustable upon the pins for binding the tread between the clips, and means for connecting the inner band with a wheel felly.

6. A resilient tire including inner and outer bands, a plurality of cushioning springs supporting the outer band with respect to the inner band, brackets carried by the outer band and each having spaced lugs provided with alined openings having key slots extending therethrough, loops formed on the outer ends of said springs and provided with key slots, bushings fitted in said loops and provided with keys engaging in the loop slots for locking the bushings against rotation, pivot pins fitting through the openings of said lugs and through said bushings and pivotally connecting the springs with the outer band, keys carried by said pins and engaging in the slots of the lugs for locking the pins against rotation, means securing the pins against displacement, and means for connecting the inner band with a wheel felly.

7. A resilient tire including inner and outer bands, cushioning springs supporting the outer band with respect to the inner band, flexible stays for limiting said cushioning springs in their outward flexing movement including means for limiting the stays in their flexing movement, means for connecting the inner band with a wheel felly, and a tire carried by the outer band.

8. A resilient tire including inner and outer bands, cushioning springs supporting the outer band with respect to the inner band, each of said springs comprising mating leaves fixed to the inner band, the outer ends of the leaves being connected with the outer band and the intermediate portions of the leaves being connected to the inner band, means connecting the inner end of each leaf with the outer end portion of the other leaf, stays connected with the inner band and engaged with the inner ends of the leaves, and means for connecting the inner band with a wheel felly.

9. A resilient tire including inner and outer bands, cushioning springs supporting the outer band with respect to the inner band, stays connected with the inner band and engaged with the free end portions of the springs for limiting the springs in their outward flexing movement, said stays being each formed of pivotally connected members, and means carried by one of said members to coact with another for limiting the members in their movement to alined position.

10. A resilient tire including inner and outer bands, a plurality of cushioning springs supporting the outer band with respect to the inner band, brackets carried by the outer band, fastening means connecting said springs with the brackets, a tread surrounding the outer band, and means carried by said fastening means securing the tread in position.

In testimony whereof I affix my signature.

WILLIAM W. ALLEN. [L. S.]